United States Patent [19]
Perrine

[11] Patent Number: 5,716,432
[45] Date of Patent: Feb. 10, 1998

[54] DESICCANT CONTAINER

[75] Inventor: Glenn Perrine, Eaton, Ohio

[73] Assignee: Stanhope Products Company, Brookville, Ohio

[21] Appl. No.: 598,570

[22] Filed: Feb. 12, 1996

[51] Int. Cl.⁶ .................................................. B01D 24/20
[52] U.S. Cl. .................... 96/135; 53/452; 55/486; 55/514; 96/138; 96/139; 96/152; 96/154; 206/204
[58] Field of Search ............ 96/135, 147, 137–139, 96/149, 151, 152, 154; 55/502, 510, 512, 514, 486, 318; 53/452, 485; 95/90, 116, 117; 206/204

[56] References Cited

U.S. PATENT DOCUMENTS

| | | | |
|---|---|---|---|
| 1,439,151 | 12/1922 | Dailey et al. | 55/518 X |
| 1,657,927 | 1/1928 | Heinzen | 220/506 X |
| 1,776,558 | 9/1930 | Herman | 220/506 |
| 1,973,717 | 9/1934 | Kessenich | 220/506 X |
| 2,139,792 | 12/1938 | Bechaud | 220/506 X |
| 2,148,770 | 2/1939 | Mittendorf | 210/131 |
| 2,181,511 | 11/1939 | Domoto | 220/506 |
| 2,325,657 | 8/1943 | Burkness | 210/134 |
| 2,334,840 | 11/1943 | Punton et al. | 96/136 |
| 2,482,779 | 9/1949 | Katz | 220/506 X |
| 2,557,557 | 6/1951 | Newcum | 210/131 |
| 2,600,435 | 6/1952 | Shapiro | 210/131 |
| 2,626,678 | 1/1953 | Yant | 55/518 X |
| 2,661,870 | 12/1953 | Huenergardt | 220/506 X |
| 2,761,527 | 9/1956 | Dreznes | 55/495 |
| 2,887,117 | 5/1959 | Rosholt | 220/784 X |
| 3,071,800 | 1/1963 | Patriquin | 92/165 X |
| 3,212,416 | 10/1965 | Boersma | 210/164 |
| 3,221,478 | 12/1965 | Norton | 96/120 |
| 3,262,599 | 7/1966 | Muller | 220/787 |
| 3,353,339 | 11/1967 | Walter | 96/137 |
| 3,360,156 | 12/1967 | Bohlman | 220/783 |
| 3,469,696 | 9/1969 | Petrucci et al. | 210/97 |
| 3,545,227 | 12/1970 | Grahl | 62/474 |
| 3,746,174 | 7/1973 | Watanabe | 210/282 |
| 3,796,025 | 3/1974 | Kasten | 55/302 X |
| 3,799,352 | 3/1974 | McClive | 210/282 |
| 3,879,292 | 4/1975 | McClive | 210/282 |
| 3,918,578 | 11/1975 | Cullen et al. | 206/204 |
| 3,926,599 | 12/1975 | Rudin et al. | 55/517 X |
| 3,961,919 | 6/1976 | Lamoreaux | 96/132 |
| 4,029,486 | 6/1977 | Frantz | 55/475 X |

(List continued on next page.)

FOREIGN PATENT DOCUMENTS

WO9526224  10/1995  WIPO.

OTHER PUBLICATIONS

Nerac "Problem Solving Report 00254.00" Dec. 7, 1993.
MACS Service Reports, "Ford's 'sump' accumulators & important changes in oil and refrigerant charge", Feb. 1996, pp. 7–8.

*Primary Examiner*—Richard L. Chiesa
*Attorney, Agent, or Firm*—Biebel & French

[57] ABSTRACT

A container for particulate desiccant includes a cup and a cap. The cup includes spaced inner and outer wall portions connected by a transverse web portion to define a chamber having an opening for receiving the desiccant. The chamber side of the transverse web includes peripheral and central flanges, or energy directors, to which a first ply of permeable lining material is ultrasonically bonded. The cap is designed for receipt in the chamber to cover the opening. In addition, the cap has a hole for receiving the inner wall portion of the cup, and the chamber side of the cap includes peripheral and central flanges, or energy directors, to which a second ply of permeable lining material is ultrasonically bonded. The inner wall portion includes a beveled inner end surface which tapers radially inwardly in a direction toward the transverse web portion to facilitate insertion of a canister pipe into the inner wall portion. The inner wall portion cooperates with the canister pipe to define a return passage for the dehydrated air or fluid that passes over the desiccant in the chamber.

41 Claims, 2 Drawing Sheets

U.S. PATENT DOCUMENTS

| | | | |
|---|---|---|---|
| 4,116,649 | 9/1978 | Cullen et al. | 55/507 X |
| 4,266,408 | 5/1981 | Krause | 62/474 |
| 4,291,548 | 9/1981 | Livesay | 62/503 |
| 4,401,447 | 8/1983 | Huber | 55/515 X |
| 4,405,347 | 9/1983 | Cullen et al. | 55/515 X |
| 4,436,623 | 3/1984 | Cullen et al. | 210/282 |
| 4,457,843 | 7/1984 | Cullen et al. | 210/282 |
| 4,464,186 | 8/1984 | Mann | 55/DIG. 17 |
| 4,464,261 | 8/1984 | Cullen et al. | 210/282 |
| 4,474,035 | 10/1984 | Amin et al. | 62/503 |
| 4,496,378 | 1/1985 | Kish | 55/465 X |
| 4,548,624 | 10/1985 | Waller | 55/274 |
| 4,573,632 | 3/1986 | Scheeren | 220/506 X |
| 4,619,673 | 10/1986 | Cullen et al. | 55/503 X |
| 4,623,368 | 11/1986 | Lancesseur | 55/512 X |
| 4,683,057 | 7/1987 | Krause et al. | 210/232 |
| 4,698,164 | 10/1987 | Ellis | 210/739 |
| 4,764,274 | 8/1988 | Miller | 210/232 |
| 4,800,018 | 1/1989 | Moser | 210/266 |
| 4,882,052 | 11/1989 | Peranio | 210/282 |
| 4,911,739 | 3/1990 | Cullen et al. | 210/282 X |
| 4,921,512 | 5/1990 | Maryyanek et al. | 55/488 |
| 4,994,185 | 2/1991 | Cullen et al. | 210/282 |
| 5,036,972 | 8/1991 | Cullen et al. | 206/204 |
| 5,038,582 | 8/1991 | Takamatsu | 62/474 |
| 5,091,036 | 2/1992 | Taylor | 156/379.6 |
| 5,119,616 | 6/1992 | Cullen et al. | 53/453 |
| 5,177,982 | 1/1993 | Plemens | 62/503 |
| 5,184,480 | 2/1993 | Kolpacke | 62/503 |
| 5,288,469 | 2/1994 | Skalla | 422/171 |
| 5,304,235 | 4/1994 | Watanabe et al. | 96/144 |
| 5,427,609 | 6/1995 | Zoglman et al. | 96/135 X |
| 5,435,153 | 7/1995 | Hutchison et al. | 62/474 |
| 5,443,626 | 8/1995 | Kiyani | 96/108 |
| 5,522,204 | 6/1996 | Wood | 53/452 |
| 5,569,316 | 10/1996 | Flaugher et al. | 96/147 X |

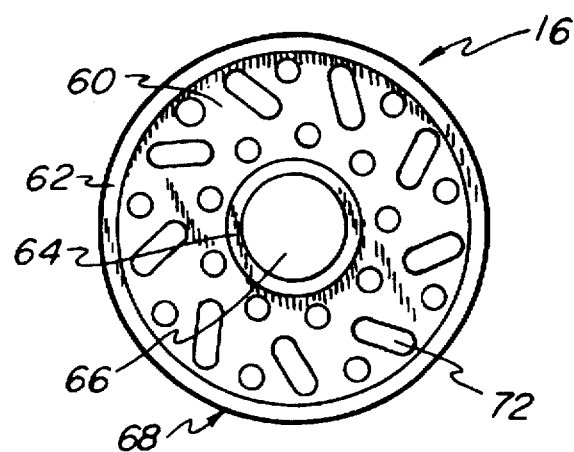
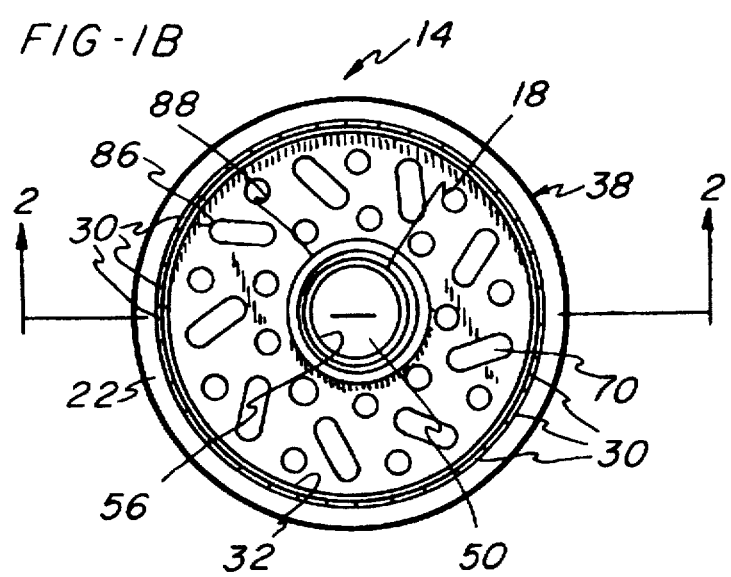

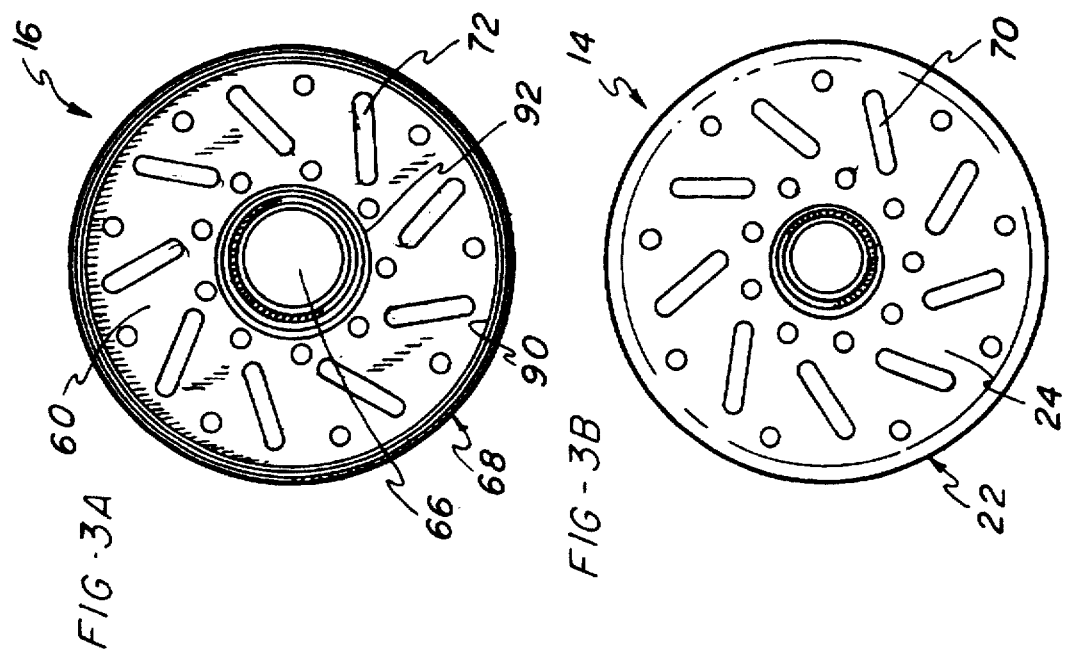
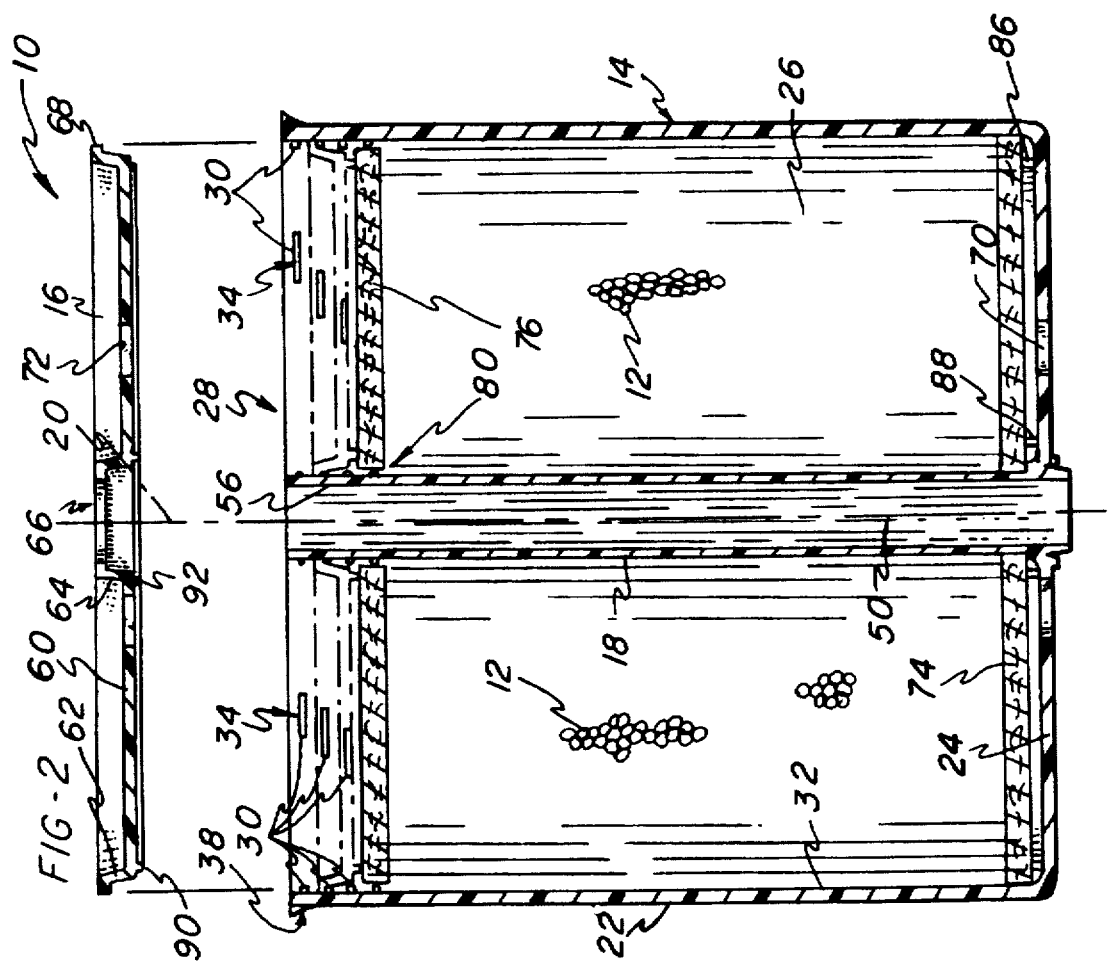

DESICCANT CONTAINER

BACKGROUND OF THE INVENTION

1. Field of the Invention

This invention relates to desiccant containers for use in air or fluid dryers of automotive air conditioning systems and the like, and more particularly, it relates to a desiccant container having peripheral and central flanges about an inner surface of a transverse web portion and an inner surface of a cap which facilitate bonding of plies of permeable lining material for holding desiccant in the container.

2. Background of the Invention

Desiccants are commonly used in automotive air conditioning systems for dehydrating air and refrigerants. Particulate desiccants are common in such systems because the high surface area-to-volume ratios of the particles facilitates the interaction of the particles with surrounding air or fluid. Since the particles of desiccant must be held in the air or fluid stream and prevented from contaminating other parts of the system, the particles must be held in a container which is permeable to the air or fluid but impermeable to the particles.

One form of dryer used in automotive air conditioning systems includes an elongated receiver or accumulator canister having inlet and outlet ports communicating with the interior of the canister. A desiccant container is positioned in the interior of the canister and allows for air and/or fluid flow through the desiccant material.

One form of package-type desiccant container for use in an accumulator or receiver dryer is constructed from synthetic felted wool or polyester which is filled with desiccant and then sealed by stitching or fusing. One disadvantage to this form of package is that the felted bag may not conform to the shape of the canister, so that air or fluid may bypass the desiccant. Another disadvantage is that the bag may be non-uniform in shape, thereby making automatic assembly of the dryer difficult.

If felted polyester is used as a less expensive substitute for felted wool, the seams of the bag may be formed by ultrasonic welding. Unfortunately, the reliability of such ultrasonic welds is questionable and the bag may open up, allowing adsorbent material to escape from the bag and potentially contaminate the system. In addition, the felted polyester bag is vulnerable to burn-through when the dryer is welded shut.

In another proposed form of an accumulator or receiver dryer, particulate desiccant is trapped between a pair of grids or plates which are welded or press fit inside the canister. According to one embodiment, the desiccant is charged by pouring the desiccant particles into the canister once a first of the grids or plates is positioned. A pipe extends through holes in the grids or plates to exhaust dried air or fluid to an outlet port.

A dryer of this form is likely to be difficult to assemble because the grids or plates must be slid into position and, in some cases, welded inside the canister. Further, since the desiccant particles are manually poured into the canister, the desiccant must be pre-measured due to the difficulty of controlling the amount of desiccant poured into the canister based on visual observation alone. The pouring of the desiccant creates a risk of accidental contamination outside the accumulator because desiccant particles may fall into the pipe communicating with the outlet port. Nevertheless, the amount of desiccant poured into the canister may vary from canister to canister for at least the reasons mentioned above.

Copending patent application Ser. No. 08/235,283, filed Apr. 29, 1994, now U.S. Pat. No. 5,522,204, incorporated herein by reference, assigned to the same assignee of the present invention, and copending patent application Ser. No. 08/396,932, filed Mar. 1, 1995, now U.S. Pat. No. 5,569,316, incorporated herein by reference, assigned to the same assignee of the present invention, each disclose a two-piece desiccant container that can be inserted within an accumulator or receiver dryer canister. The desiccant container includes a cup for holding particulate desiccant and a removable cap which retains the particulate desiccant within the cup.

The cup includes a tubular inner wall portion, a concentric outer wall portion, and a transverse web portion that cooperate to define a chamber for holding the desiccant. The inner wall portion defines a central axially extending sleeve for receiving an aluminum canister tube of the accumulator or receiver dryer canister. The container includes two plies of permeable lining material for trapping the desiccant within the chamber. In operation, air or fluid passes through the desiccant material and dehydrated air or fluid is returned through the inner wall portion and canister tube to the air conditioning system. Compressive loading of the desiccant within the container is relied upon to maintain the desiccant securely within the chamber, but some desiccant may escape past the edges of the permeable lining material to contaminate the air conditioning system.

SUMMARY OF THE INVENTION

These disadvantages and others are met by means of the present invention embodied in a container for a particulate desiccant which comprises a generally cylindrical cup and a removable cap for retaining the particulate desiccant. The cup includes spaced inner and outer wall portions connected by a transverse web portion that cooperate to define a chamber having an opening for receiving the particulate desiccant.

The cap is designed for receipt in the chamber to hold the desired particulate desiccant material in place in the cup. In addition, the cap has a hole for receiving the inner wall portion of the cup when the cap is received in the chamber.

Both the transverse web portion and the cap are perforated to allow air or fluid to reach the desiccant housed therein. The container includes first and second plies of permeable lining material that trap the particulate desiccant in the container.

Both the transverse web portion and the cap include on their surfaces proximate the chamber a pair of concentric radially spaced-apart flanges ("energy directors") to which the edges of the first and second plies of permeable lining material are mechanically secured when the plies are ultrasonically bonded to the transverse web portion and the cap, respectively.

Therefore, it is one object of the invention to provide a desiccant package that is simple to assemble, reduces material costs, and reliably prevents loss of desiccant. This and other objects, features and advantages of the present invention will be described in further detail in connection with preferred embodiments of the invention shown in the accompanying drawings, wherein:

BRIEF DESCRIPTION OF THE DRAWINGS

FIG. 1A is a top plan view of the desiccant container cap;

FIG. 1B is a top plan view of the desiccant container without the cap installed;

FIG. 2 is a cross-sectional view of the desiccant container taken along the line 2—2 in FIG. 1B with the cap shown in elevation above and detached from the container and with the cap also shown in phantom as attached to the container;

FIG. 3A is a bottom plan view of the cap; and

FIG. 3B is a bottom plan view of the desiccant container.

DETAILED DESCRIPTION OF THE PREFERRED EMBODIMENTS

FIGS. 1A–3B illustrate a desiccant container 10 (FIG. 2) for holding desiccant particles or beads 12 that comprises a generally cylindrically cross-sectioned cup 14 and a cap 16.

As best seen in FIG. 2, the cup 14 is a one-piece plastic molding that includes a cylindrical inner wall portion 18 extending along a central axis 20, a cylindrical outer wall portion 22 concentric with the inner wall portion 18, and a bottom defined by a transverse wall or web portion 24 that joins the inner wall portion 18 to the outer wall portion 22. The inner and outer wall portions 18, 22 and the transverse web portion 24 cooperate to define a chamber 26 having an opening 28 for receiving the desiccant 12.

The cylindrical outer wall portion 22 includes a plurality of axially and circumferentially spaced-apart beads or nib segments 30 projecting radially inwardly from an inner surface 32 of the outer wall portion 22. The plurality of nib segments 30 are arranged into four axially spaced-apart groupings 34 proximate a cap side of the container 10. The nib segments 30 within each grouping 34 are oriented in a common plane which extends transverse to the central axis 20. Further, the nib segments 30 within each grouping 34 are circumferentially spaced-apart by approximately 45°. As discussed further below, the nib segments 30 permit the cap 16 to be retained within the chamber 26 in the tightest possible location in order to reduce or prevent movement or shifting of the particulate desiccant 12 within the chamber 26.

As shown, the outer wall portion 22 also includes an outwardly flared lip portion 38. The flared lip portion 38 is adapted to resiliently fit within a dryer canister of an air conditioning or refrigeration system (not shown). Thus, the desiccant container 10 is retained within the dryer canister by means of a friction or interference fit provided by the flared lip portion 38. The lip portion 38 also serves as a continuous annular seal to prevent air or fluid escape that may otherwise occur along the interface between the circumference of the cup 14 and the dryer canister. The lip portion 38 may be omitted in many instances with the o.d. of the cup 14 itself so dimensioned as to provide for a snap or friction fit within the i.d. of the corresponding accumulator or canister.

The inner wall portion 18 serves as a sleeve for receiving a portion of an aluminum pipe or conduit (not shown) which communicates with an outlet port (not shown) of the air conditioning or refrigeration system. The inner wall portion 18 includes a beveled inner end surface 56 at the cap side thereof. The beveled inner end surface 56 tapers radially inwardly in a direction toward the transverse web portion 24 to facilitate insertion of the aluminum pipe or conduit.

The transverse web portion 24, on a side proximate the chamber 26, includes an annular peripheral flanged portion 86 extending axially from an outer circumference proximate the outer wall 22, and a central annular flanged portion 88 extending axially from an inner circumference proximate the inner wall 18.

As best shown in FIGS. 1A and 1B, the cap 16 conforms to the circular shape of the cup 14. The cap 16 includes an intermediate planar portion 60, a first peripheral flanged portion 62 extending transversely from an outer circumference of the intermediate planar portion 60, and a first central flanged portion 64 extending transversely from an inner circumference of the intermediate planar portion 60. A hole 66 extends through the central flanged portion 64 for receiving the inner wall portion 18 of the cup 14 in an assembled state. The cap 16 includes, on a side proximate the chamber 26, a second annular peripheral flanged portion 90 (FIG. 3A) extending axially from an outer circumference of the intermediate planar portion 60, and a second annular central flanged portion 92 extending axially from an inner circumference of the intermediate planar portion 60.

The first peripheral flanged portion 62 of the cap includes an edge portion 68 which cooperates with the nib groupings 34 to positively lock the cap 16 to the cup 14. (See FIG. 2) That is, the outer diameter of the edge portion 68 is greater than the inner diameter of the nib groupings 34. Further, the edge portion 68 has an axial thickness which is less than the axial spacing between adjacent nib groupings 34 so that the edge portion 68 can be positively retained between axially adjacent nib groupings 34.

The cap 16 is sufficiently resilient so that when the cap 16 is attached or detached from the cup 14, the edge portion 68 will pass over the nib groupings 34 when sufficient force is applied to the cap 16. In the preferred embodiment, the edge portion 68 is circumferentially continuous. However, the edge portion 68 could be circumferentially intermittent if desired.

The transverse web portion 24 of the cup 14 and the intermediate planar portion 60 of the cap 16 are each perforated with a number of symmetrically arranged ports or perforations 70, 72, respectively, so that the intermediate planar portion 60 and the transverse web portion 24 are each permeable to the air or fluid to be dried. In the example shown, the ports 70, 72 are arranged in concentric annular rows such that the inner row has nine ports and the outer row has eighteen ports. The precise arrangement and shape of the ports is not critical to the operation of the desiccant container 10 as long as the desiccant 12 remains contained and air or fluid (not shown) is allowed to enter the container 10, interact evenly with the desiccant 12 and exhaust from the container 10.

As shown in FIG. 2, a first ply 74 and a second ply 76 of a permeable lining material, such as felted polyester or gauze, are placed inside the chamber 26 near the transverse web portion 24 and the chamber-side of the cap 16 to trap the desiccant 12 in the container 10. The lining material must be permeable to the air or fluid to be dried (not shown) but impermeable to the particulate desiccant 12. If gauze is used, the mesh size of the gauze must be significantly smaller than the grain size of the desiccant. The material presently preferred for use is a polyester felt material, but other synthetic thermoplastic felt like fabrics can also be used. While the plies 74, 76 are shown as circular liners or pads having central holes 78, 80, respectively, embracing and surrounding the inner wall portion 18, the plies may also be separate plies of a permeable capsule or pouch (not shown), such as a toroidal capsule shaped to surround the inner wall portion 18.

One method for fabricating the desiccant container 10 includes the step of casting or injection molding the cup 14 to form a one-piece plastic member having the inner and outer wall portions 18, 22 connected by the transverse web portion 24. One plastic suited for use in casting the cup 14 is polypropylene. Polyethylene may also be used but is not preferred. The cap 16 is likewise cast from plastic.

The first ply 74 of the permeable lining material is inserted by sliding it down the inner wall portion 18 until positioned adjacent the transverse web portion 24. The first ply 74 is then ultrasonically welded or heat sealed to the transverse web 24 along the annular peripheral flanged portion 86 and central flanged portion 88. The desiccant 12 is then charged into the chamber 26, as by pouring. Since the chamber 26 is toroidal and relatively shallow, desiccant 12 the desiccant 12 in the chamber 26 can be seen through the opening 28 so that the proper amount of desiccant 12 is charged in a manual operation.

The second ply 76 of the permeable lining material is ultrasonically welded or heat sealed to the cap 16 at the second annular peripheral flanged portion 90 and second annular central flanged portion 92. The cap 16 is then inserted into the chamber 26 such that the inner wall portion 18 extends through the hole 66 in the cap 16 and the second ply 76 is oriented toward the desiccant 12. As the cap 16 is urged downwardly toward the transverse web portion 24, the edge portion 68 of the cap 16 passes radially inwardly over the axially spaced nib groupings 34 until the intermediate planar portion 60 of the cap 16 snugly sandwiches the second ply 76 against the charged desiccant 12. In a locked state, the cap 16 abuts against the second ply 76 and charged desiccant 12 while the edge portion 68 thereof is lockingly retained by at least one nib grouping 34.

Depending upon the specific amount of desiccant 12 contained in the chamber 26, the edge portion 68 may be lockingly retained between axially adjacent nib groupings 34, or the edge portion 68 may abut against a nib grouping 34 positioned axially adjacent the edge portion 68 in the cap side direction.

Once the desiccant container 10 is assembled, it can then be inserted into a dryer canister or accumulator in, for example, an automobile air conditioning or refrigerator system (not shown). The outwardly flared lip portion 38 resiliently bears against an inside surface of the dryer canister to provide a snug fit of the desiccant container 10 in the dryer canister. The lip portion 38 also serves to prevent air or fluid from bypassing the desiccant container 10 so as to ensure passage thereof through the chamber 26 and over the desiccant particles 12.

In operation, the air or fluid to be dried passes through ports 72 in the cap 16, through second ply 76, over the desiccant 12 in the chamber 26, through first ply 74, through ports 70 in the transverse web 24, and into a reservoir (not shown) in the dryer canister. The dried air or fluid is returned to the air conditioning system through a passage 50 formed by inner wall 18, and through a canister tube (not shown) received within the inner wall portion 18.

The cup 14 may be vibrator or bowl fed to a robotic arm (not shown) for automatic installation into the dryer canister or accumulator. Furthermore, the plies 74, 76 of permeable lining material are relatively resistant to burn-through in the cup 14 while the dryer canister is being welded (not shown). As stated previously, the cup 14 may be sized to fit snugly in the canister to inhibit bypass flow of air or fluid to be dried. The nib groupings 34 for detaining the cap 16 on the cup 14, and the flanged portions 86, 88, 90, 92 for mechanically securing the plies 74, 76 to the cup 14 and cap 16, respectively, are highly reliable so the risk that desiccant will escape and contaminate other parts of the air conditioning or refrigeration system (not shown) is minimized.

The annularly shaped portions 86, 88, 90, and 92 provide raised, level surfaces for anchoring or heat sealing of the felt like filter material to the cup and cap respectively. Additionally they serve as containment ridges helping to maintain the desiccant particles in the cup chamber in those instances in which the felt may be loosened from its normally fixed engagement to the transverse wall of the cup or to the cap.

The flanges 86, 88, 90 and 92 provide a more uniformly level surface for the filter material to bond to as compared to direct heat sealing of the felt like filter to the planar transverse web or underside of the cap. Also, the substantially smaller area of these flanges 86, 88, 90 and 99 facilitates mechanical bonding of the plies 74, 76 to the cup 14 and cap 16, respecitvely. These small mounting or welding surfaces melt during ultrasonic welding or heat sealing and then penetrate into the felt to improve filter adhesion to the cup surfaces.

Various changes or modifications in the invention described may occur to those skilled in the art without departing from the true spirit or scope of the invention. The above description of preferred embodiments of the invention is intended to be illustrative and not limiting, and it is not intended that the invention be restricted thereto but that it be limited only by the true spirit and scope of the appended claims.

What is claimed is:

1. A container for a particulate desiccant, said container comprising:
   a cup member including an outer wall portion and an inner wall portion, a transverse web portion connected to said outer wall portion and said inner wall portion to define a chamber having an opening; and
   a cap for receipt in said chamber; and
   first and second plies of permeable lining material for placement in said chamber to trap the particulate desiccant in said chamber;
   said transverse web portion having a flange formed therein adapted for sealing engagement by bonding to one of said plies of permeable lining material.

2. The container as recited in claim 1 wherein said transverse web portion and said cap include perforations therein.

3. The container as recited in claim 1 wherein said outer wall is a cylinder.

4. The container as recited in claim 1 wherein said outer wall portion includes a flared lip extending outwardly from said outer wall.

5. The container as recited in claim 1 wherein said outer wall portion includes a detent positioned to detain said cap in said chamber, said detent comprising a raised bead on said outer wall portion.

6. The container as recited in claim 1 wherein said outer wall portion includes a detent positioned to detain said cap in said chamber, said detent comprising a resilient flange on said outer wall portion.

7. The container as recited in claim 1 wherein said cap has a peripheral surface adapted for frictional engagement with an inner surface of said outer wall portion to detain said cap in said chamber.

8. The container as recited in claim 1 wherein said cup is a one-piece molding.

9. A container for a particulate desiccant, said container comprising:
   a cup member including spaced inner and outer wall portions connected by a transverse web portion to define a chamber having an opening; and
   a cap for receipt in said chamber, said cap having a hole for receiving said inner wall portion when said cap is received in said chamber; and first and second plies of permeable lining material for placement in said chamber to trap the particulate desiccant in said chamber;

a flange positioned about the periphery of said transverse web portion adapted for sealing engagement by bonding to said first ply of permeable lining material;

said cap having a flange positioned about the periphery of said cap adapted for sealing engagement by bonding to said second ply of permeable lining material.

10. The container as recited in claim 9 wherein said transverse web portion and said cap include perforations therein.

11. The container as recited in claim 9 wherein said outer and inner wall portions are concentric cylinders.

12. The container as recited in claim 9 wherein said inner wall portion defines a passage open at either end on different sides of said container.

13. The container as recited in claim 9 wherein said outer wall portion includes a flared lip extending outwardly from said outer wall.

14. The container as recited in claim 9 wherein said outer wall portion includes a detent positioned to detain said cap in said chamber, said detent comprising a raised bead on said outer wall portion.

15. The container as recited in claim 9 wherein said outer wall portion includes a detent positioned to detain said cap in said chamber, said detent comprising a resilient flange on said outer wall portion.

16. The container as recited in claim 9 wherein said cap has a peripheral surface adapted for frictional engagement with an inner surface of said outer wall portion to detain said cap in said chamber.

17. The container as recited in claim 9 wherein said cup is a one-piece molding.

18. A container for a particulate desiccant, said container comprising:

a cup member including spaced inner and outer wall portions connected by a transverse web portion to define a chamber having an opening; and a cap for receipt in said chamber, said cap having a hole for receiving said inner wall portion when said cap is received in said chamber; and first and second plies of permeable lining material for placement in said chamber to trap the particulate desiccant in said chamber;

said chamber having a first flange about the periphery of said transverse web portion and a second flange about the inner circumference of said transverse web portion adapted for sealing engagement by bonding to said first ply of permeable lining material;

said cap having a third flange about the periphery of said cap and a fourth flange about the inner circumference of said cap adapted for sealing engagement by bonding to said second ply of permeable lining material.

19. The container as recited in claim 18 wherein said transverse web portion and said cap include perforations therein.

20. The container as recited in claim 18 wherein said outer and inner wall portions are concentric cylinders.

21. The container as recited in claim 18 wherein said inner wall portion defines a passage open at either end on different sides of said container.

22. The container as recited in claim 18 wherein said outer wall portion includes a flared lip extending outwardly from said outer wall.

23. The container as recited in claim 18 wherein said outer wall portion includes a detent positioned to detain said cap in said chamber, said detent comprising a raised bead on said outer wall portion.

24. The container as recited in claim 18 wherein said outer wall portion includes a detent positioned to detain said cap in said chamber, said detent comprising a resilient flange on said outer wall portion.

25. The container as recited in claim 18 wherein said cap has a peripheral surface adapted for frictional engagement with an inner surface of said outer wall portion to detain said cap in said chamber.

26. The container as recited in claim 18 wherein said cup is a one-piece casting.

27. The container as recited in claim 18 wherein said inner wall portion has a stepped inner surface defining an intermediate flange for preventing a canister pipe from passing completely through said inner wall portion.

28. The container as recited in claim 18 wherein said inner wall portion includes a beveled inner end surface which tapers radially inwardly in a direction toward the transverse web portion to facilitate insertion of a canister pipe into said inner wall portion.

29. A container for a particulate desiccant, said container comprising:

a cup member including spaced inner and outer wall portions connected by a transverse web portion to define a chamber having an opening; and a cap for receipt in said chamber, said cap having a hole for receiving said inner wall portion when said cap is received in said chamber; and first and second plies of permeable lining material for placement in said chamber to trap the particulate desiccant in said chamber;

said chamber having a first flange about the periphery of said transverse web portion and a second flange about the inner circumference of said transverse web portion adapted for sealing engagement by bonding to said first ply of permeable lining material;

said cap having a third flange about the periphery of said cap and a fourth flange about the inner circumference of said cap adapted for sealing engagement by bonding to said second ply of permeable lining material;

said transverse web portion and said cap include perforations therein;

said outer and inner wall portions are concentric cylinders;

said inner wall portion defines a passage open at either end on different sides of said container;

said outer wall portion includes a flared lip extending outwardly from said outer wall;

said outer wall portion includes a detent positioned to detain said cap in said chamber;

said cap has a peripheral surface adapted for frictional engagement with an inner surface of said outer wall portion to detain said cap in said chamber;

said cup being a one-piece casting.

30. A container adapted for housing a desiccant material and a filter medium therein, said container comprising:

a cup member including an outer wall portion, an inner wall portion and a transverse wall portion connecting said inner wall portion and said outer wall portion to define a chamber to contain said desiccant, said chamber further including at least one raised surface portion protruding therein adapted for mounting by bonding to said filter medium thereon.

31. A container as recited in claim 30 wherein said at least one raised surface comprises a first flange formed in said transverse wall portion.

32. A container as recited in claim 31 wherein said first flange comprises an annularly shaped ridge.

33. A container as recited in claim 32 wherein said transverse wall portion comprises a second annularly shaped ridge spaced apart from and concentric to said first ridge.

34. A container as recited in claim 31 further comprising a cap, said cap having a top side and an underneath side, said cap superposed over said cup whereby said cap underside closes said chamber, said cap underside also comprising a raised surface portion thereon for mounting said filter medium thereon.

35. A container as recited in claim 34 wherein said raised surface portion on said underside of said cap comprises a first annular ridge and a second annular ridge, said first and second annular ridges being concentric with respect to each other and radially spaced apart.

36. A container for a particulate desiccant, said container comprising:

a cup member including an outer wall portion and an inner wall portion, a transverse web portion connected to said outer wall portion and said inner wall portion to define a chamber having an opening; and a cap for receipt in said chamber; and first and second plies of permeable lining material for placement in said chamber to trap the particulate desiccant in said chamber;

said transverse web portion having a flange formed therein bonded to one of said plies of permeable lining material.

37. A container as recited in claim 36 wherein said flange is ultrasonically weld bonded to one of said plies of permeable lining material.

38. A container as recited in claim 36 wherein said flange is heat seal bonded to one of said plies of permeable lining material.

39. A container adapted for housing a desiccant material and a filter medium therein, said container comprising:

a cup member including an outer wall portion, an inner wall portion and a transverse wall portion connecting said inner wall portion and said outer wall portion to define a chamber to contain said desiccant, said chamber further including at least one raised surface portion protruding therein and bonded to said filter medium thereon.

40. A container as recited in claim 39 wherein said medium flange is ultrasonically weld bonded to one of said filter medium.

41. A container as recited in claim 39 wherein said flange is heat seal bonded to one of said filter medium.

* * * * *